United States Patent
Karnawat et al.

(10) Patent No.: US 9,083,724 B2
(45) Date of Patent: Jul. 14, 2015

(54) SYSTEM ITERATIVELY REDUCING I/O REQUESTS DURING MIGRATION OF VIRTUAL STORAGE SYSTEM

(71) Applicant: NETAPP, INC., Sunnyvale, CA (US)

(72) Inventors: Rakshit Karnawat, Bangalore (IN); Harsha Sridhara, Bangalore (IN); Balaji Ramani, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 306 days.

(21) Appl. No.: 13/905,920

(22) Filed: May 30, 2013

(65) Prior Publication Data

US 2014/0359058 A1 Dec. 4, 2014

(51) Int. Cl.
*G06F 15/16* (2006.01)
*H04L 29/08* (2006.01)
*H04L 12/801* (2013.01)
*H04L 12/803* (2013.01)
*H04L 12/825* (2013.01)
*H04L 12/815* (2013.01)
*G06F 17/30* (2006.01)
*G06F 3/06* (2006.01)

(52) U.S. Cl.
CPC .......... *H04L 67/1097* (2013.01); *G06F 3/067* (2013.01); *G06F 3/0611* (2013.01); *G06F 3/0617* (2013.01); *G06F 3/0647* (2013.01); *G06F 17/30283* (2013.01); *H04L 47/10* (2013.01); *H04L 47/125* (2013.01); *H04L 47/13* (2013.01); *H04L 47/225* (2013.01); *H04L 47/25* (2013.01); *H04L 47/263* (2013.01)

(58) Field of Classification Search
CPC ....... H04L 47/10; H04L 47/125; H04L 47/13; H04L 47/225; H04L 47/25; H04L 47/263; G06F 17/30283
See application file for complete search history.

(56) References Cited

U.S. PATENT DOCUMENTS

| | | | |
|---|---|---|---|
| 6,721,789 B1 * | 4/2004 | DeMoney | 709/219 |
| 8,452,856 B1 | 5/2013 | Lent et al. | |
| 8,812,806 B2 * | 8/2014 | Fredricksen et al. | 711/165 |
| 2008/0222375 A1 * | 9/2008 | Kotsovinos et al. | 711/162 |
| 2008/0288948 A1 * | 11/2008 | Attarde et al. | 718/103 |
| 2009/0125962 A1 * | 5/2009 | Colosky et al. | 725/116 |

(Continued)

FOREIGN PATENT DOCUMENTS

WO WO2012/058169 5/2012

OTHER PUBLICATIONS

International Search Report and Written Opinion on corresponding PCT application (PCT/US2014/038730) from International Searching Authority (EPO) dated Aug. 13, 2014.

*Primary Examiner* — Le H Luu
(74) *Attorney, Agent, or Firm* — Klein, O'Neill & Singh, LLP

(57) ABSTRACT

Method and system for a non-disruptive migration of a source virtual storage system from a source cluster to a destination cluster is provided. The method includes monitoring a current transfer rate for migrating information from the source cluster to the destination cluster during a migration operation; iteratively reducing a rate at which I/O requests are processed until a transfer rate for transferring the information from the source cluster to the destination cluster within the duration is reached; and entering a cutover phase for the migration operation when the virtual storage system presented by the source cluster is taken offline for the duration and after the information is migrated to the destination cluster, the virtual storage system is presented by the destination cluster.

24 Claims, 11 Drawing Sheets

(56) References Cited

U.S. PATENT DOCUMENTS

| | | | |
|---|---|---|---|
| 2009/0259791 A1* | 10/2009 | Mizuno et al. | 710/316 |
| 2010/0332401 A1* | 12/2010 | Prahlad et al. | 705/80 |
| 2011/0022812 A1* | 1/2011 | van der Linden et al. | 711/163 |
| 2011/0225359 A1 | 9/2011 | Kulkarni et al. | |
| 2011/0231604 A1* | 9/2011 | Taguchi et al. | 711/114 |
| 2012/0239859 A1* | 9/2012 | Lary et al. | 711/103 |

* cited by examiner

SYSTEM ITERATIVELY REDUCING I/O REQUESTS DURING MIGRATION OF VIRTUAL STORAGE SYSTEM

TECHNICAL FIELD

The present disclosure relates to storage systems and more particularly, to virtual storage system migration.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server"), which is a processing system configured to store and retrieve data on behalf of one or more client computing systems ("clients"). The storage system may be presented to a client system as a virtual storage system with storage space for storing information. The virtual storage system is associated with a physical storage system but operates as an independent system for handling client input/output (I/O) requests.

The virtual storage system may be migrated from one source system to a destination system. It is desirable to complete a migration operation from the source to the destination within a duration that is non-disruptive for clients. Continuous efforts are being made for efficiently performing a migration.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon.

The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Figure 1:
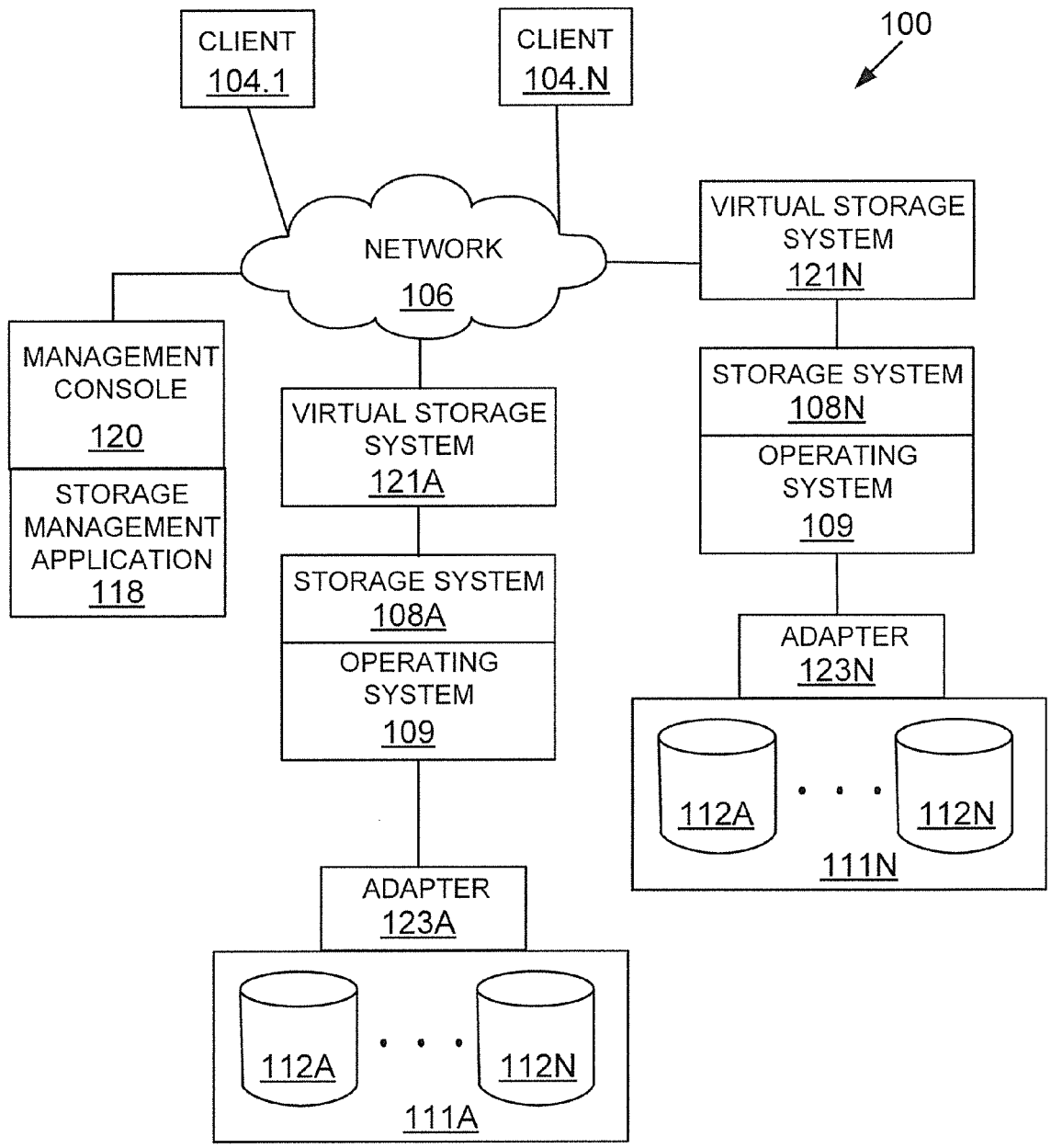
FIG. 1 shows an example of a storage environment, used according to one embodiment.

Storage Environment 100: FIG. 1 depicts an illustrative embodiment of a non-clustered storage environment 100, including a plurality of client computing systems/devices 104.1-104.N (may also be referred to as client 104 or clients 104), storage systems 108A-108N (may also be referred to as storage system 108), a management console 120 and at least one network 106 communicably connecting client systems 104.1-104.N, storage systems 108 and management console 120.

Clients' 104.1-104.N may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Each storage system 108 may include or interface with a storage subsystem 111 (shown as 111A-111N) having multiple mass storage devices 112A-112N (may also be referred to as storage device(s) 112) and at least an adapter 123 (shown as 123A-123N) that interfaces between storage system 108 and storage devices 112. Adapter 123 may be a network interface card, a host bus adapter, a host channel adapter or any other adapter type that can interface with storage system 108 for facilitating execution of input/output requests. The mass storage devices 112 may be, for example, conventional magnetic disks, optical disks such as CD-ROM or DVD based storage, magneto-optical (MO) storage, or any other type of non-volatile storage devices suitable for storing structured or unstructured data.

The storage system 108 executes a storage operating system 109 for managing storage space within storage subsystem 111 and presenting storage space to clients 104. As an example, storage operating system 109 maybe the DATA ONTAP® storage operating system, available from NetApp®, Inc., that implements a Write Anywhere File Layout (WAFL®) storage system, or any other suitable storage operating system.

Storage operating system 109 and applications running on the client systems 104.1-104.N communicate according to well-known protocols, such as the NFS protocol or the CIFS protocol, to make data stored on storage device 112 appear to users and/or application programs as though the data were stored locally on the client systems 104.1-104.N. CIFS means the Common Internet File System Protocol, an access protocol that client systems use to request file access services from storage systems over a network. NFS means a Network File System, a protocol that allows a user to access storage over a network.

Storage operating system 109 can present or export data stored on at storage devices 112 as a volume, or one or more qtree sub-volume units, to each of the client systems 104.1-104.N. In one embodiment, a volume is a logical data set which is an abstraction of physical storage, combining one or more physical mass storage devices or parts thereof into a single logical storage object. From the perspective of a client system 104, each volume can appear to be a single storage drive. However, each volume can represent the storage space in one storage device, an aggregate of some or all of the storage space in multiple storage devices, a RAID group, or any other suitable set of storage space. Each volume is configured to store data containers, for example, data files, scripts, word processing documents, executable programs, structured and unstructured data and the like. Specifically, each volume can include a number of individually addressable files.

In a typical mode of operation, one of the client systems 104.1-104.N transmits one or more I/O commands, such as an NFS or CIFS request, over network 106 to the storage system 108. The storage system 108 issues one or more I/O commands to storage device 112 to read or write the data on behalf of the client system. The storage system 108 also issues an NFS or CIFS response containing the requested data over network 106 to the client system.

In some instances, operating system 109 may present storage system 108 to clients as virtual storage systems 121A-121N (may also be referred to as a "VServer" and also referred to as virtual storage system 121). The virtual storage system 121 is addressable by the client systems and handles input/output commands, just like storage system 108. This allows one to present a physical storage system as multiple virtual storage systems to various clients.

Each virtual storage system 121 is associated with a physical storage system 108. For example, as shown in FIG. 1, virtual storage system 121A is associated with storage system 108A, while virtual storage system 121N is associated with storage system 108N.

Each virtual storage system is assigned a unique access address that is used by a client to access the storage system. For example, each virtual storage system is assigned an Internet Protocol (IP) address that is used by client 104 to send I/O commands. The IP address may be assigned when virtual storage system 121 is configured using a management application 118 executed by management console 120. The management console 120 may be, for example, a conventional PC, workstation, or the like. The storage management application 118 can be a software application, typically used by a storage network administrator to manage a pool of storage devices and configure virtual storage system 121.

Communication between the storage management application 118 and storage system 108 may be accomplished using any of the various conventional communication protocols and/or application programming interfaces (APIs), the details of which are not germane to the technique being introduced here. This communication can be done through the network 106 or it can be done via a direct link (not shown) between the management console 120 and one or more of the storage systems.

Clustered System: The embodiments disclosed above have been described with respect to a non-cluster based storage system 108 that may have a traditional monolithic architecture where a storage server has access to a dedicated storage subsystem. However, the adaptive embodiments can be implemented in a cluster based system that has a distributed architecture and where VServers can be migrated from one node to another node. The cluster based system is described below in detail.

Figure 2:
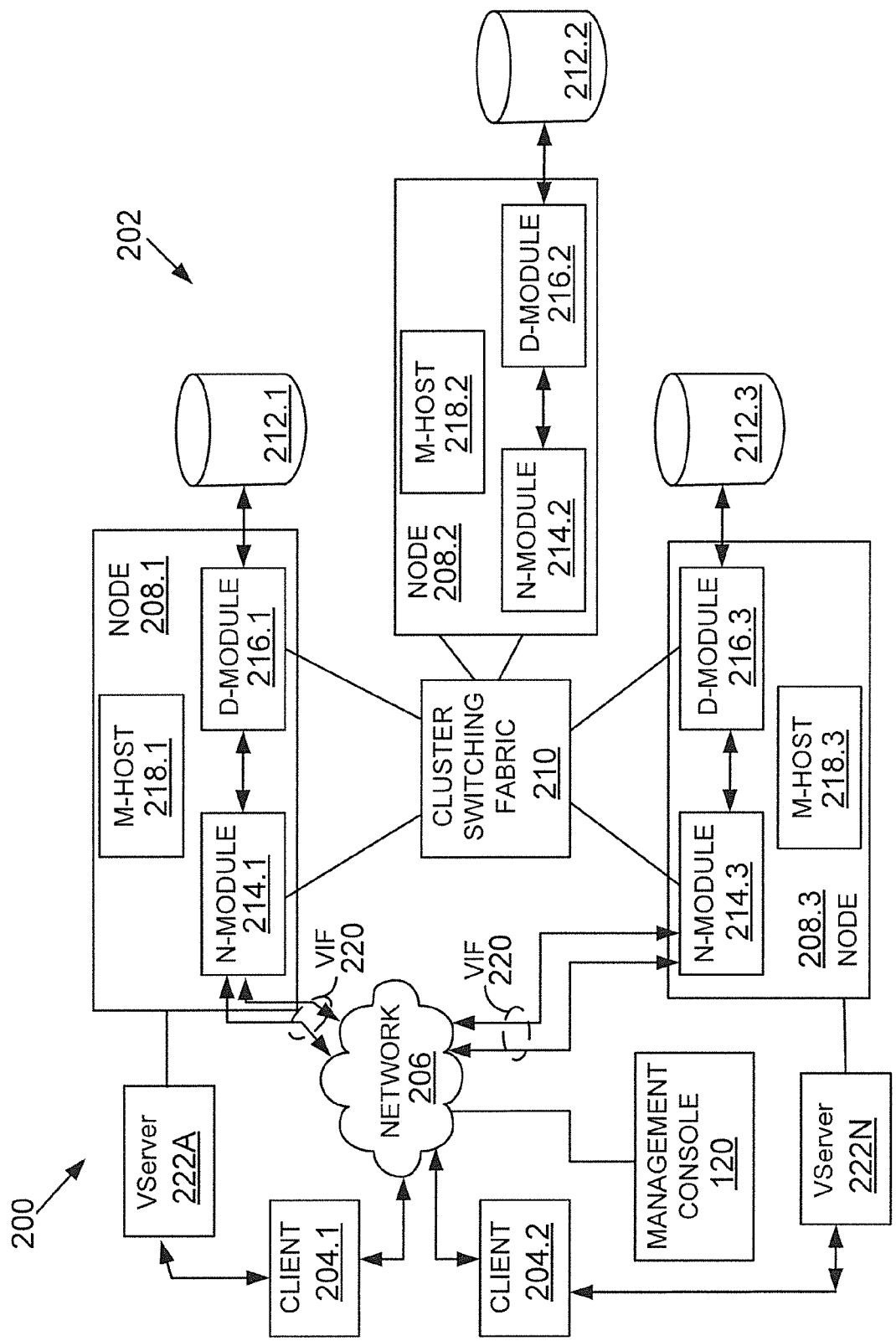
FIG. 2 shows a block diagram of a cluster based storage system, used according to one embodiment.

FIG. 2 depicts an illustrative embodiment of a storage environment 200 including a plurality of client systems 204.1-204.2 (similar to clients 104.1-104.N), a clustered storage system 202 and at least one computer network 206 communicably connecting the client systems 204.1-204.2 and the clustered storage system 202. As shown in FIG. 2, the clustered storage system 202 includes a plurality of nodes 208.1-208.3, a cluster switching fabric 210, and a plurality of mass storage devices 212.1-212.3.

Each of the plurality of nodes 208.1-208.3 is configured to include an N-module, a D-module, and an M-host, each of which can be implemented as a separate processor executable or machine implemented module. Specifically, node 208.1 includes an N-module 214.1, a D-module 216.1, and an M-host 218.1, node 208.2 includes an N-module 214.2, a D-module 216.2, and an M-host 218.2, and node 208.3 includes an N-module 214.3, a D-module 216.3, and an M-host 218.3.

The N-modules 214.1-214.3 include functionality that enables the respective nodes 208.1-208.3 to connect to one or more of the client systems 204.1-204.2 over the computer network 206, while the D-modules 216.1-216.3 connect to one or more of the storage devices 212.1-212.3.

The M-hosts 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective N-modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2 depicts only the VIFs 220 at the interfaces to the N-modules 214.1, 214.3 for clarity of illustration.

The clustered storage system 202 can be organized into any suitable number of VServers 222A-222N (similar to 121, FIG. 1), in which each virtual storage system represents a single storage system namespace with separate network access. Each virtual storage system has a user domain and a security domain that are separate from the user and security domains of other virtual storage systems. Client systems can access storage space via a VServer from any node of the clustered system 202.

Each of the nodes 208.1-208.3 may be defined as a computer adapted to provide application services to one or more of the client systems 204.1-204.2. In this context, a VServer is an instance of an application service provided to a client system. The nodes 208.1-208.3 are interconnected by the switching fabric 210, which, for example, may be embodied as a Gigabit Ethernet switch.

Although FIG. 2 depicts three N-modules 214.1-214.3, the D-modules 216.1-216.3, and the M-Hosts 218.1-218.3, any other suitable number of N-modules, D-modules, and M-Hosts may be provided. There may also be different numbers of N-modules, D-modules, and/or M-Hosts within the clustered storage system 202. For example, in alternative embodiments, the clustered storage system 202 may include a plurality of N-modules and a plurality of D-modules interconnected in a configuration that does not reflect a one-to-one correspondence between the N-modules and D-modules.

The client systems 204.1-204.2 of FIG. 2 may be implemented as general-purpose computers configured to interact with the respective nodes 208.1-208.3 in accordance with a client/server model of information delivery. In the presently disclosed embodiment, the interaction between the client systems 204.1-204.2 and the nodes 208.1-208.3 enable the provision of network data storage services. Specifically, each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the NFS or CIFS protocol, when accessing information in the form of files and directories.

In a typical mode of operation, one of the client systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address, and that each VIF can migrate from N-module to N-module using the process flow described below. The client request typically includes a file handle for a data file stored in a specified volume on at storage 212.1-212.3.

Figure 3A:
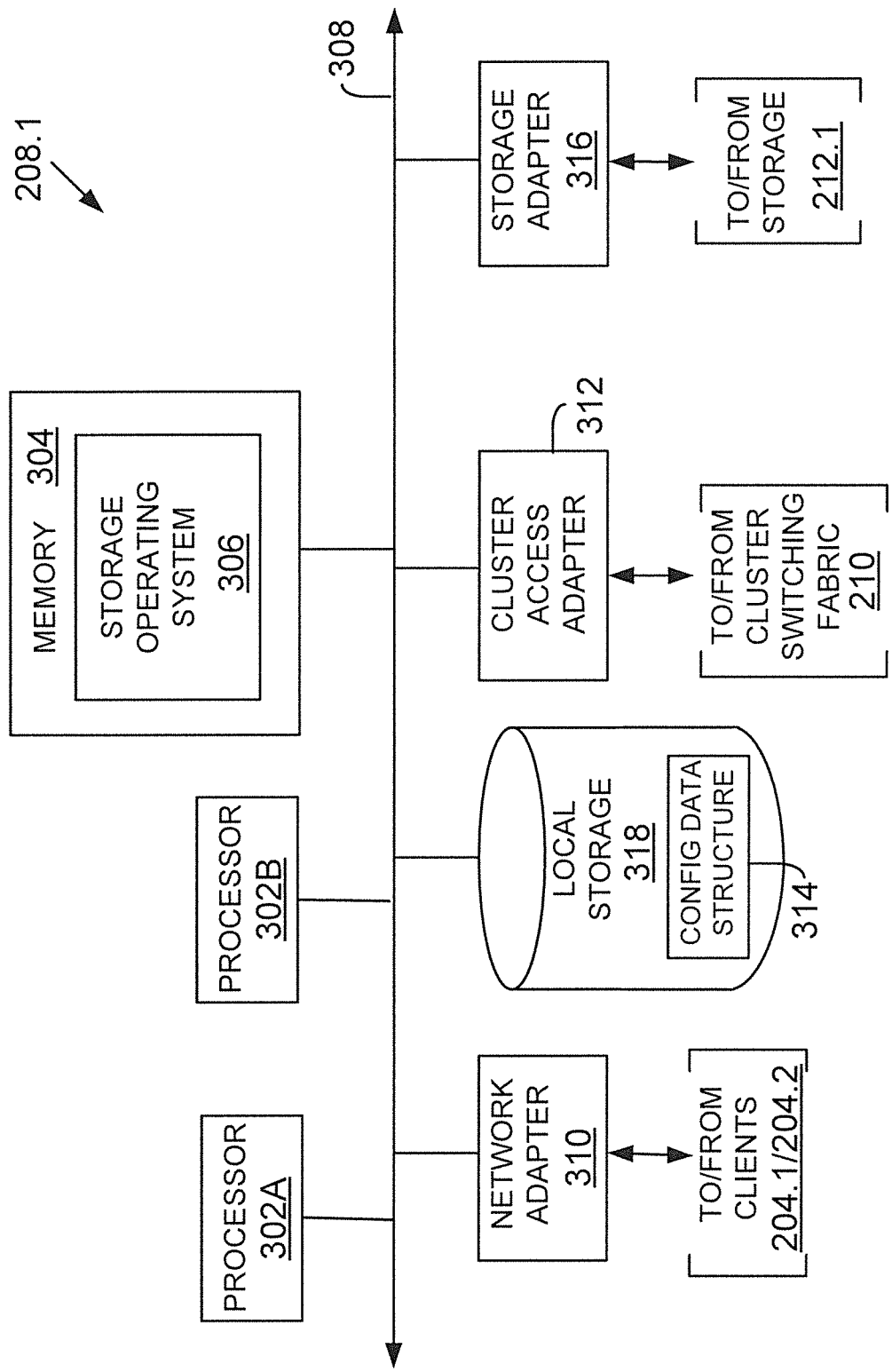
FIG. 3A shows an example of a node used in cluster based storage system, used according to one embodiment.

Storage System Node: FIG. 3A is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. The local storage 313 comprises one or more storage devices utilized by the node to locally store configuration information (e.g., in a configuration data structure 314).

Node 208.1 may manage a plurality of storage volumes for a VServer that is migrated from one cluster to another. The system and processes for migrating a VServer are described below in more detail.

The cluster access adapter 312 comprises a plurality of ports adapted to couple node 208.1 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 312 is utilized by the N/D-module for communicating with other N/D-modules in the cluster 100.

Each node 208.1 is illustratively embodied as a dual processor storage system executing a storage operating system 306 (similar to 109, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 3028 executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 306, portions of which is typically resident in memory and executed by the processing elements, functionally organizes the node 208.1 by, inter alia, invoking storage operations in support of the storage service implemented by the node.

The network adapter 310 comprises a plurality of ports adapted to couple the node 208.1 to one or more clients 204.1/204.2 over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.2 may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 3B:
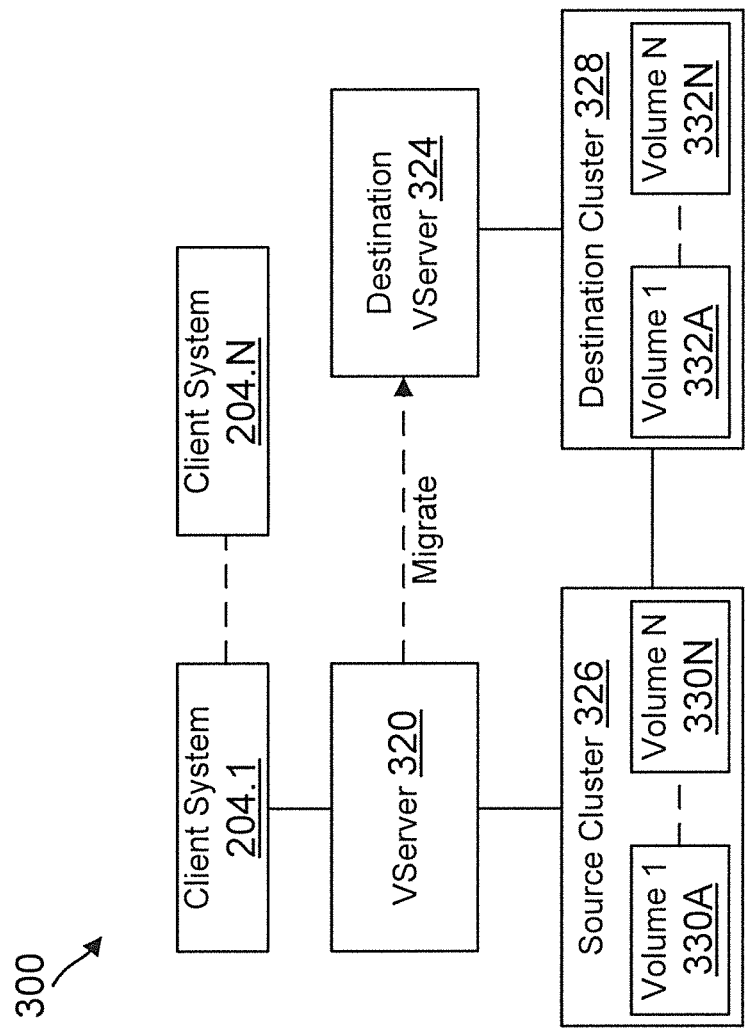
FIG. 3B shows a high level system for migrating information from a source cluster to a destination cluster, according to one embodiment.

VServer Migration: FIG. 3B shows an example of migrating a VServer 320 from a source cluster 326 to a destination VServer 324 at a destination cluster 328. Clusters 326 and 328 are similar to cluster 202 described above with respect to FIG. 2 having a plurality of nodes. The VServer 320 is presented to clients 204.1-204.N. The clients can read and write data using storage volumes 330A-330N at the source cluster via the Vserver 324. The storage volumes may be managed by one or more nodes of source cluster 326.

To migrate VServer 320 during a migration operation, first a destination VServer 324 is created at the destination cluster 328 during a setup phase. The destination volumes 332A-332N are then created at the destination cluster to store information associated with source volumes 330A-330N at the source cluster 326.

The attributes of the destination volumes are similar to the attributes of the source volumes. As an example, storage volume attributes include a storage volume size, a unique storage volume identifier, permissions for reading and/or writing information and others. The storage volume attributes may be stored at a data structure and generally created during a storage volume configuration process, the details of which are not germane to the embodiments disclosed herein.

During a baseline phase of the migration operation, a snapshot (without derogation any trademark rights of NetApp Inc. in the term "Snapshot") of the source VServer 320 is taken and replicated at the destination cluster. The term snapshot as used herein means a point in time copy of a storage file system. The snapshot is a persistent point in time (PPT) image of the file system that enables quick recovery of data after data has been corrupted, lost, or altered. Snapshots can be created by copying data at predetermined point in time to form a consistent image, or virtually by using a pointer to form the image of the data.

After the baseline image is generated, during an update phase, any changes to the storage volumes at the source cluster 326 are incrementally replicated at the destination cluster by taking incremental snapshots. This may be referred to as incremental replication.

After the update phase, the migration operation enters an "administrative cutover" phase. During this phase, the process, as described below in detail, determines if the entire migration can be completed within a "cutover" duration. The cutover duration is a maximum time during which a storage volume may be unavailable to a client. The cutover duration is based on the protocol used to access and communicate with a VServer, for example, NFS, CIFS and others. It is desirable to complete the migration within the cutover duration so that client I/O requests are not disrupted.

The embodiments described herein iteratively determine a transfer rate at which data is being migrated at any given time and throttles down processing of write requests to ascertain if the migration can be completed within the cutover duration. The write requests are throttled so that the resources consumed by client traffic can instead be used for completing the migration operation.

Once the system determines that cutover can be achieved, then the migration operation enters the cutover phase, during which access to VServer 320 via the source cluster 326 is frozen and a timer is started to monitor cutover completion within the cutover duration. A final snapshot of the source volumes is then taken and replicated at the destination cluster. Configuration information regarding VServer 320 is also replicated at the destination cluster. Thereafter, during an activation phase, the destination VServer 324 is started and client requests for reading or writing information are handled by the destination VServer 324. The processes and details of the various modules involved in the migration operation are described below with respect to FIGS. 3C-3E.

Figure 3C:
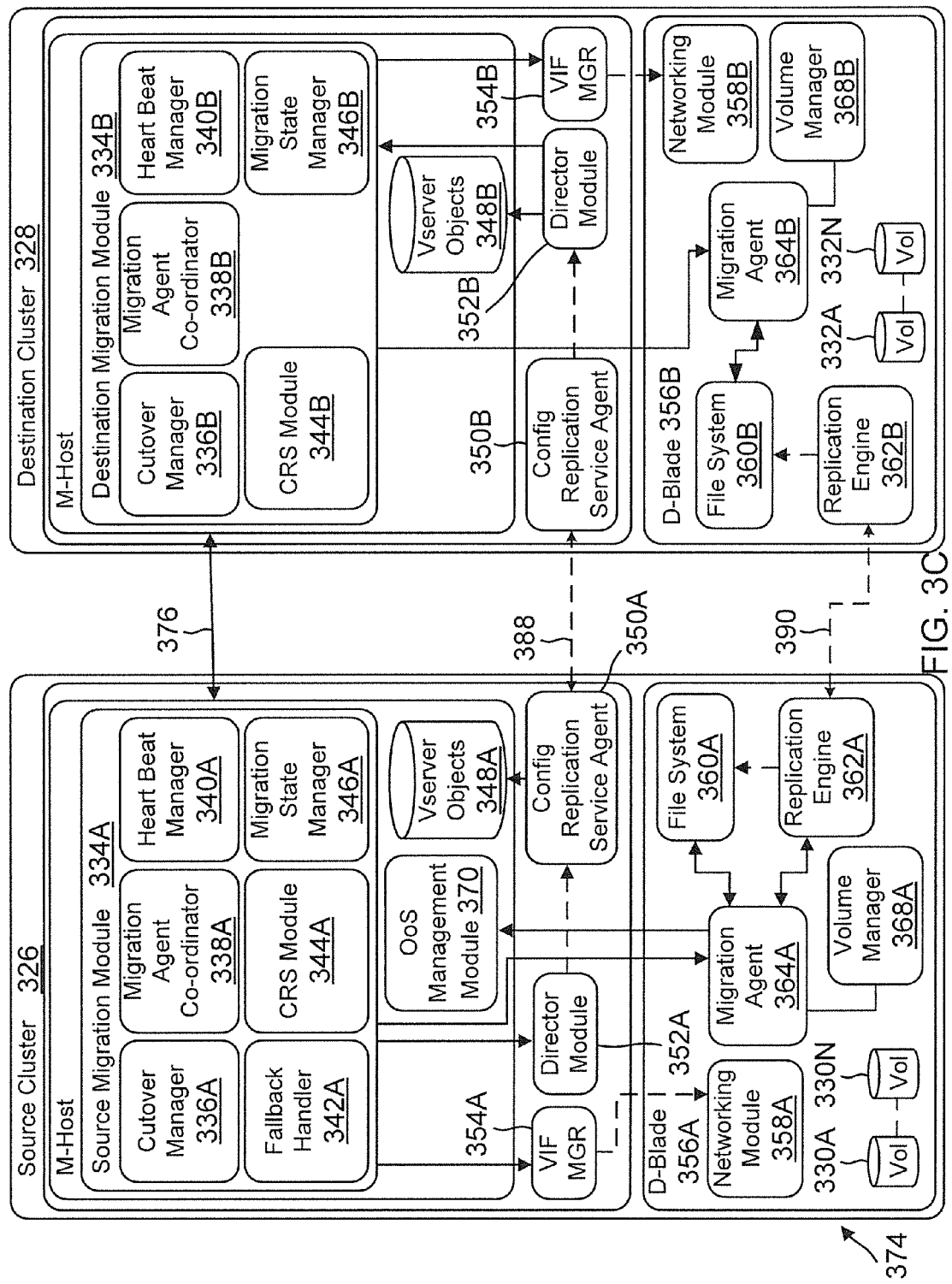
FIG. 3C shows a detailed architecture of a system for migration information, according to one embodiment.

FIG. 3C shows a block diagram of a system 374 that is used for migrating VServer 320 in a clustered environment, according to one embodiment. The various modules at the source cluster 326 and the destination cluster 328 may be implemented at N-Module, D-Module and/or M-hosts. The adaptive embodiments are not limited to the location where a specific module is being implemented.

In one embodiment, the source cluster 326 executes a source migration module 334A and the destination cluster executes a migration module 334B having a plurality of components. The instructions for the source migration module 334A may be executed by a processor out of a memory device.

In one embodiment, a cutover manager 336A is provided at the source cluster 326 and a cutover manager 336B is provided at the destination cluster 328. The cutover manager 336A and 336B are responsible for handling the various steps involved during the cutover phase described below in detail.

System 374 also includes migration agent coordinators 338A and 338B at the source cluster 326 and destination cluster 328, respectively. The migration agent coordinators co-ordinate among a plurality of migration agents that are executed at a plurality of nodes within each cluster, as described below in detail.

System 374 includes a heart beat manager 340A and 340B executed at the source cluster 326 and destination cluster 328, respectively. The heart beat managers send messages to each other using link 376 to ensure that the nodes at the source cluster and the destination cluster are operational during the migration operation. The heart beat managers also maintain a timer to track successful completion of cutover within the cutover duration, which may be 120 seconds.

If a cutover attempt fails or cannot be completed within the permitted cutover duration, then the system uses fall back handler 342A at the source cluster 326 for maintaining access to VServer 320. The fallback handler 342A will bring back the VServer 320 online and rolls back any configuration changes that may have been made to the destination VServer 324 during the different migration operation phases.

System 374 also includes a migration state manager 346A and 346B at the source cluster 326 and destination cluster 328, respectively. The migration state managers maintain a current state of a state machine that manages the migration process. The state machine may be executed by a master migration agent, as described below in detail.

In one embodiment, system 374 also includes a configuration replication service (CRS) module 344A and 344B at the source cluster 326 and the destination cluster, respectively. The CRS module 344A interfaces with a CRS agent 350A via a director module 352A that interfaces with CRS agent 350B to copy configuration information of VServer 320. The configuration information may be stored as VServer objects 348A and copied via link 388. At the destination cluster 328, the CRS agent 350B provides the configuration information to a director module 352B that stores the information as VServer objects 348B at the destination cluster 328.

Both the source and the destination cluster nodes also execute a VIF manager module 354A and 354B, respectively. The VIF manager modules provide a virtual interface to networking modules 356A and 356B at the D-Module 360A and 360B, respectively. The networking modules provide an interface between N-Modules and D-Modules.

System 374 also executes a plurality of migration agents 364A and 364B, according to one embodiment. It is noteworthy that when there are multiple nodes in source cluster 326, then one migration agent, for example, 364A interfaces with other migration agents for managing the migration operation involving storage volumes that are spread out and managed by different D-Modules. The migration agent 364A then may operate as a master migration agent.

In one embodiment, migration agent 364A generates snapshots of the storage volumes 330A-330N via a volume manager 368A. The volume manager 368A may be a part of a file system 360A of a storage operating system. Once snapshots are taken, migration agent 364A initiates updates at the destination cluster via a replication engine 362A. Both the migration agent and the replication engine interface with the file system 360A of the storage operating system that is described below in detail.

The migration agent 364A also interfaces with a quality of service (QOS) module 370 to throttle and manage client traffic during the migration operation, as described below in detail. Migration agent 364A also maintains the state of the migration as executed by a state machine, described below in detail.

At the destination cluster, migration agent 360B interfaces with file system 360B and the replication engine 362 to ensure that information and snapshots are being updated at the destination cluster.

Replication engine 362A uses a block replication protocol (BRE) that is used to transfer information from D-blade 356A to D-Module 356B via link 390. One example of such a BRE is the SpinNp protocol provided by NetApp Inc, the assignee of the present application and without derogation of any trademark rights of NetApp Inc. Details of SpinNp are not germane to the embodiments disclosed herein.

Figure 3D:
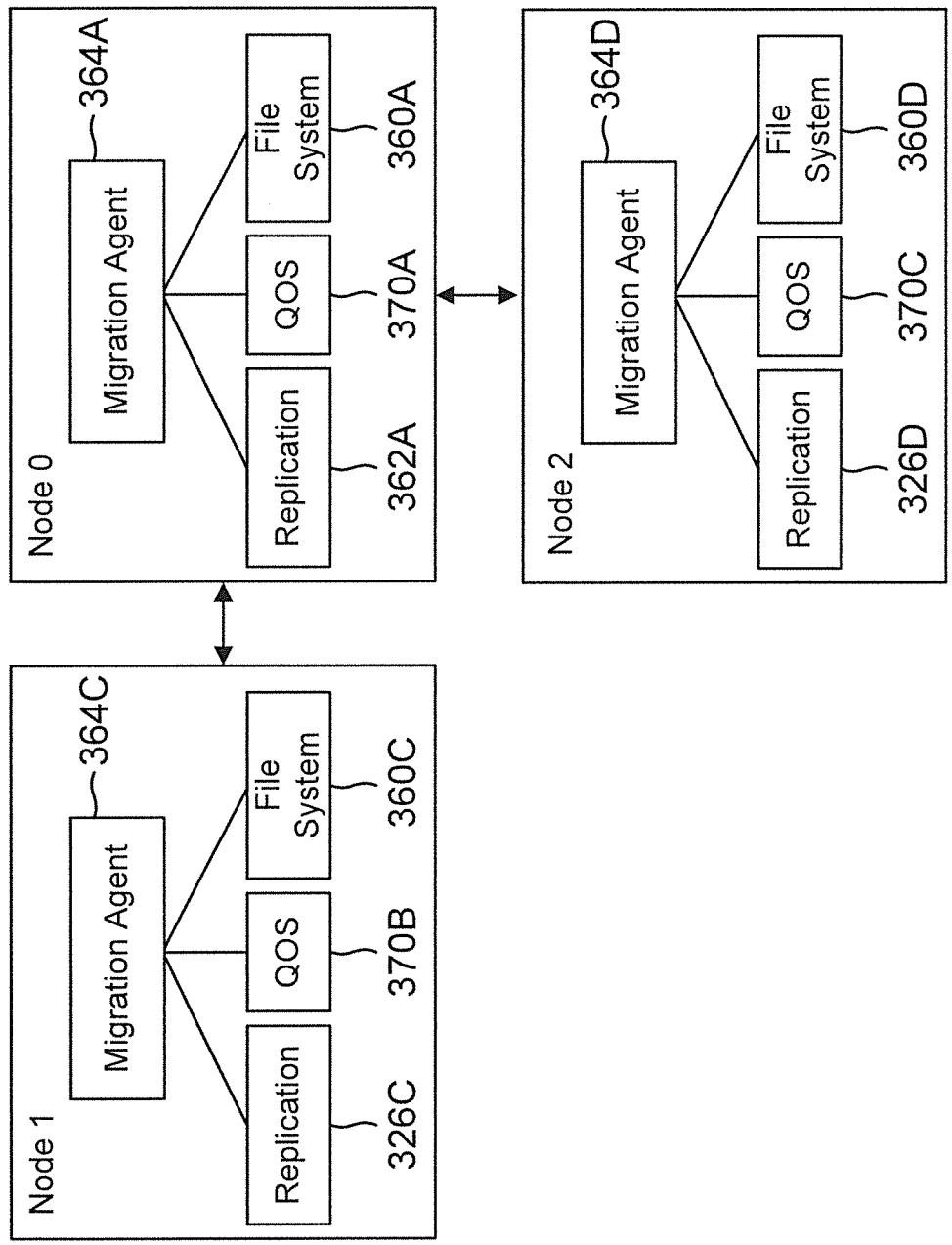
FIG. 3D shows an example of using a migration agent at a plurality of nodes, according to one embodiment.

FIG. 3D shows an example of multiple nodes and migration agents that are involved in a migration operation. Node 0 in FIG. 3D operates as the master node with migration agent 364A operating as a master migration agent. Nodes 1 and 2 have migration agents 364c and 364D interfacing with at least the replication engines 362C and 362D, QOS modules 370B and 370C and the file systems 360C and 360D. Details of the migration process are provided below.

Figure 3E:
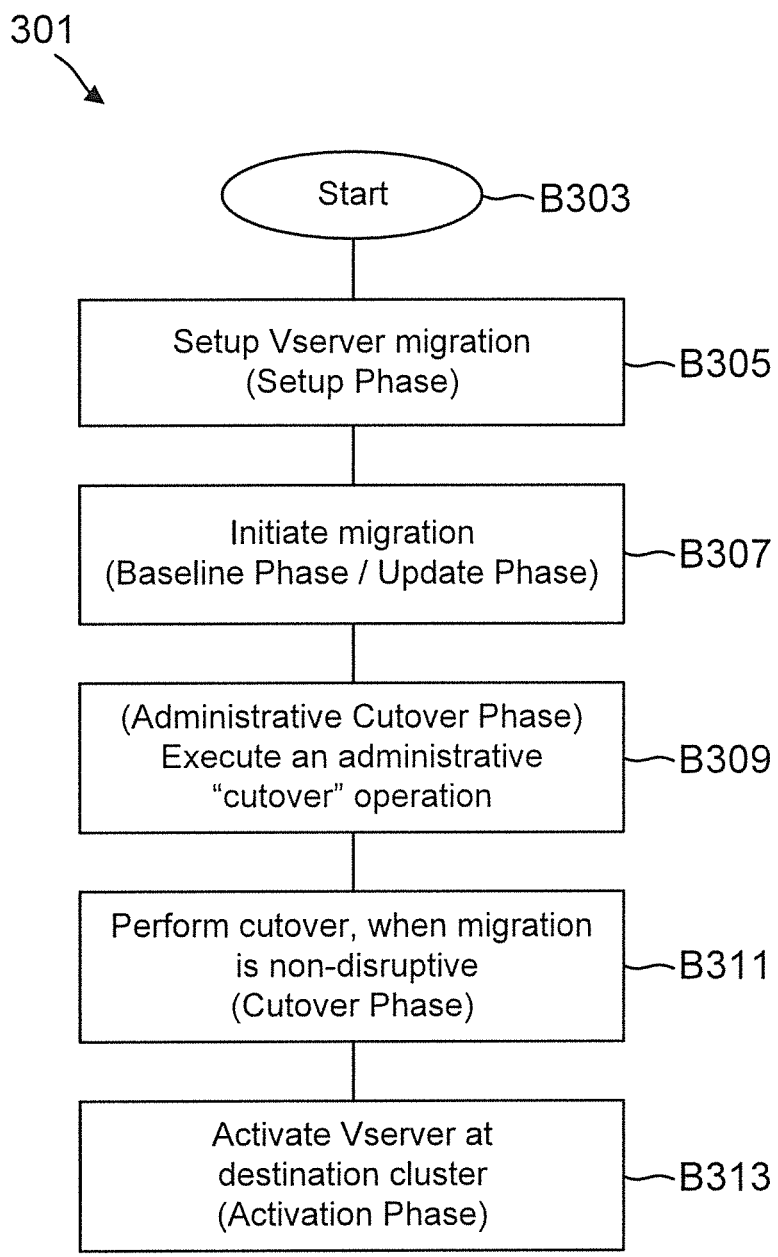
FIGS. 3E-3G show process flows for migrating information according to one embodiment.
Figure 3F:
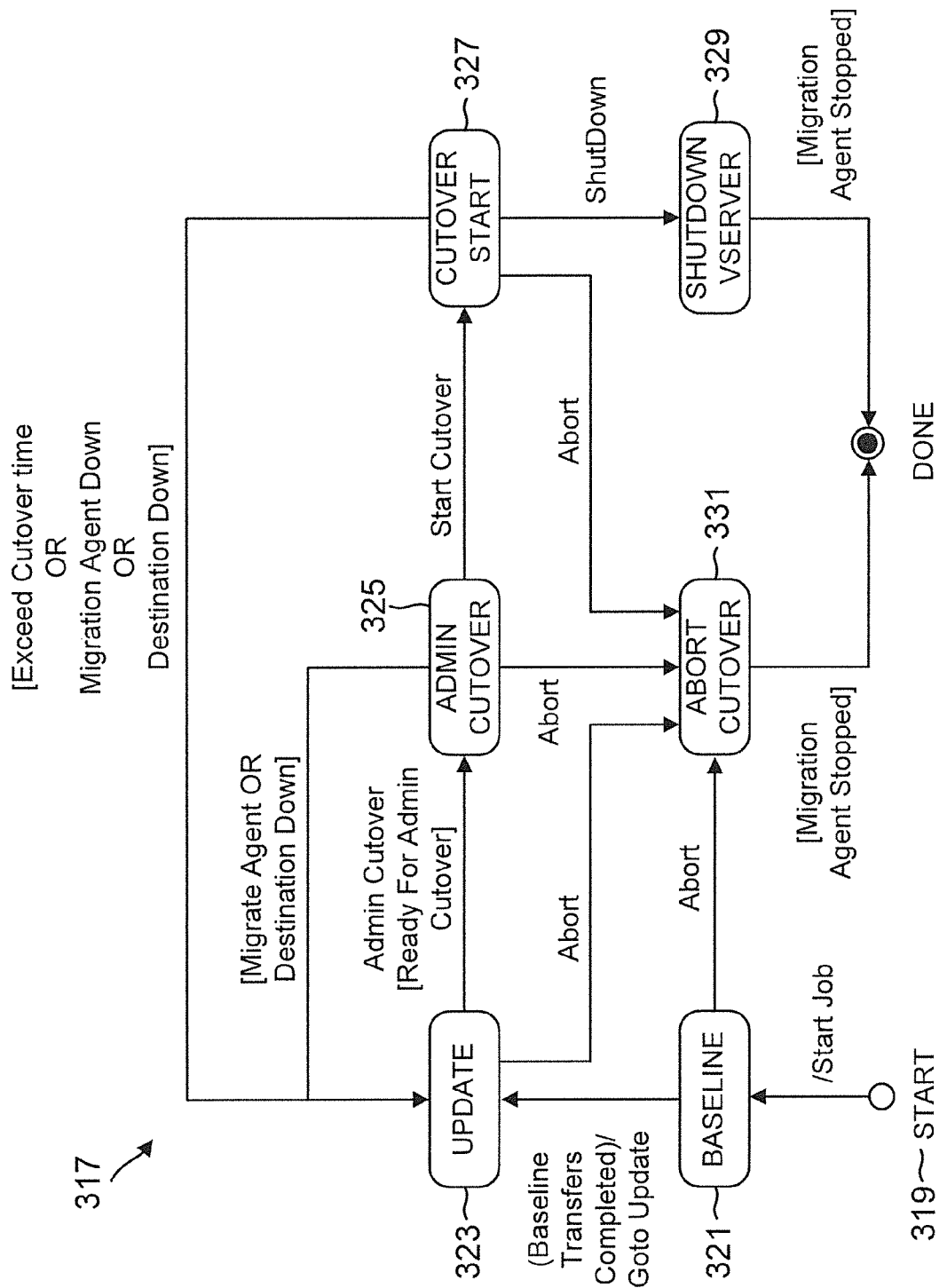

FIG. 3E shows a high level process 302 with the various phases of a migration operation, according to one embodiment. The process begins in block B303. In block B305, a setup phase for migrating VServer 320 from the source cluster 326 to a destination cluster 328 is executed. During the setup phase a storage administrator performs pre-check operations to determine that there are no conflicts with the migration. For example, if a storage volume is in the middle of a "volume move" operation from one location to another, then migration may not be initiated.

During block B305, the destination VServer 324 is created as a place holder that resembles the source VServer 320. This includes creating storage volumes at the destination with the same name and size, appropriate logical interfaces (LIFs) at the appropriate network ports with a same address (for example, IP addresses and world wide numbers (WWNs) of the source storage volumes. The state of the source VServer 320 is set to a special state, indicating that it is being migrated. The state of the destination VServer 324 is set to indicate that it is the migration destination for VServer 320 such that the LIFs presented to clients for destination VServer 324 are not initialized until the migration operation is completed. In one embodiment, the destination VServer 324 may be generated using a graphical user interface (GUI) or a command line interface (CLI).

In block B307, a baseline and an update phase for the migration is executed. During the baseline phase, a snapshot of volumes 330a-330N is taken and then transferred by replication engine 362A using link 390. First, a baseline transfer of the storage volume data is started. Once that is completed, then incremental changes to the storage volumes 330A-330N are replicated at the destination cluster 328 during the update phase. Replication continues, until the data at the source and destination clusters is within a desired level.

In block B309, an administrative cutover phase is executed. The goal of the administrative phase is to complete incremental replication of VServer 320 within a certain duration, for example, X seconds. This is achieved by monitoring a rate at which replication occurs at any given time and then ascertain the duration in which the replication can be completed. If the duration is more than X seconds, then the QOS module 370 is used to throttle down the rate at which I/O requests for clients is being processed. This provides more bandwidth and resources towards the replication. The replication time is measured again to ensure that replication can be completed within X seconds. The administrative phase is described below in detail with respect to FIG. 3E.

In block B311, the cutover phase is executed. This phase is monitored by the cutover manager 336A as described below in detail. A timer is started by the heartbeat manager 340A. A final snapshot of source volumes 330A-330N is taken. The final snapshot is then transferred to the destination cluster 328 using the BRE protocol via link 390. The destination volumes 332A-332N are then modified so that they match the source volumes. The LIFs that present the VServer 320 to the clients are shut down.

It is noteworthy that if the system detects that the migration will not complete within the cutover duration, then a fallback phase is executed. During fallback, the VServer 320 is brought online and the migration operation returns to the administrative cutover phase.

In block B313, an activate phase is executed. During this phase, an identifier for the destination VServer 324 is modified such that the identity of the destination VServer 324 is exactly the same as that of the source VServer 320. This enables a client to access VServer 324 without changing anything at the client system. The LIFs at the destination cluster 328 are activated allowing clients to communicate with the destination cluster 328. The storage volumes 330A-330N are taken offline and optionally, VServer 320 may be deleted. I/O operations for clients using destination cluster 328 are then started.

FIG. 3E shows a state machine diagram 317 executed by a state machine, according to one embodiment. The state machine may be executed by the migration state manager 346A/migration agent 364A or any other module to track the various migration operation phases that have been described above with respect to FIG. 3D.

A migration operation starts at state 319, when the setup phase for the migration operation is started. The migration agents at each node of the source cluster 326 are started.

A baseline snapshot of the source storage volumes 330A-330N is taken at state 321. If there is a failure at this state, the migration enters an abort state 331. The abort state can be entered from various states, as shown in FIG. 3E.

After the baseline snapshots are taken, the snapshots are transferred to the destination cluster 328. Thereafter, the migration enters an update phase at state 323. During this state, incremental changes to the source volumes, after the baseline snapshots continue to be transferred to the destination cluster 328. After certain number of transfers, the migration is ready to enter into the administrative cutover phase at state 325. This state is reached when the migration agent 364A receives a "Ready for Admin Cutover" message from all the migration agents of the plurality of nodes that are affected by the migration operation within the source cluster 326 as well as the destination cluster 328.

As mentioned above, during the administrative cutover state, the system determines if the transfer from the source cluster can be completed within a certain duration, for example, X seconds. This is an iterative process during which the migration agents of each node communicate with the QOS modules to throttle client traffic such that the replication can take priority over processing of I/O requests. A heartbeat thread is also started during this phase to ensure that both source and cluster nodes are on-line. Once all the migration agents confirm with the master migration agent (for example, 364A) that replication can be completed within the X seconds, then the master migration agent sends a message to the destination cluster to start the cutover phase at state 327.

During this state, the migration agents and the heart beat threads are monitored to ensure that the migration agents and the destination cluster nodes are online. A timer is also started to ensure that cutover can be completed within an appropriate time. During cutover, a final snapshot of the source volumes is taken and transferred to the destination cluster. The configuration information of the source volumes is also transferred to the destination cluster. If for some reason, the timer expires, a migration agent or the destination cluster 328 go offline, the migration operation reverts back to the update state 323. In another embodiment, the migration state may move to the abort state 331 when the cutover operation is aborted.

If the final snapshots are successfully transferred and the source volumes are quiesced, then the shutdown VServer at state 329 is reached. During this state, the activate phase described above is executed. Thereafter, the migration operation is completed.

Figure 3G:
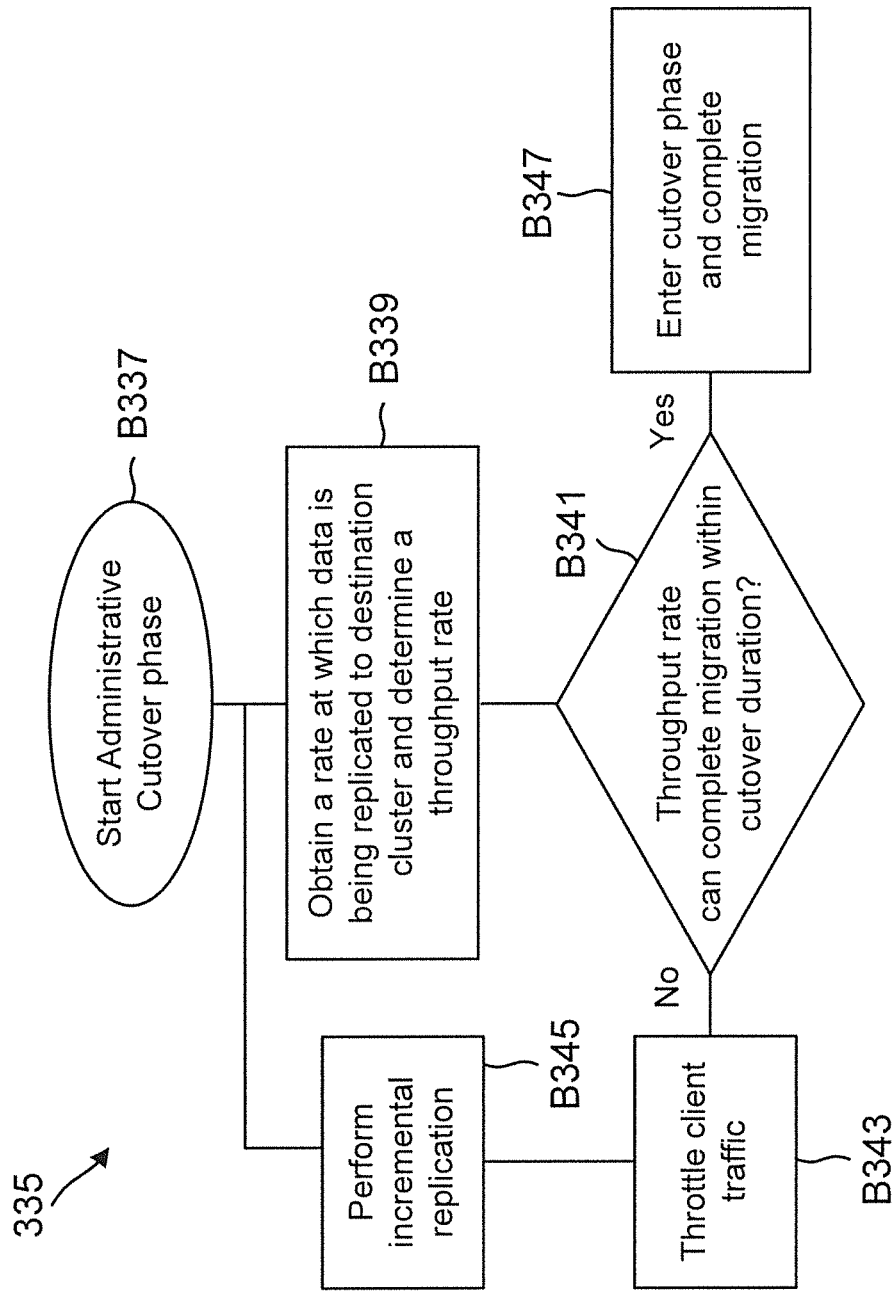

FIG. 3G shows a process 335 for executing the administrative phase, according to one embodiment. The process begins in block B337.

In block B339, a current transfer rate at which information is being transferred by the replication engine 362A is obtained by the migration agent 364A. As explained above, the replication engine 362A is responsible for transferring information between the source and destination clusters. The replication engine 362A maintains a data structure (not shown) to track the amount of information that is transferred within a given duration. This transfer rate is provided to the migration agent 364A. When the storage volumes affected by the migration operation are spread out among multiple nodes, then the migration agent of each node provides the information to migration agent 364A, operating as a master migration agent.

In one embodiment, the migration agent 364A receives the transfer rate over a period of time so that the migration agent can tabulate the average transfer rate over the period of time. The migration agent then determines a throughput rate (or convergence rate) to ascertain if the migration operation can be completed within the cutover duration. The throughput rate may be based on the product of the average transfer rate and the cutover duration.

In block B341, the migration agent determines if the throughput rate is enough to complete the duration within the cutover duration. The migration agent 364A makes this determination by monitoring the actual transfer rate over a certain duration in the administrative cutover phase. The monitoring step is performed so that the system can reliably enter the cutover phase.

If the throughput rate is low and cannot complete the migration operation within the cutover duration, in block B343, the migration agent 362A notifies the QOS module 370 of all the migration agents within the source cluster that are affected by the migration operation to throttle down processing of client I/O requests such that more resources are allocated to the migration operation for completing the transfer.

In one embodiment, QOS module 370 maintains a plurality of data structure for allocating bandwidth for client I/O requests. The bandwidth may be assigned by a storage administrator. The bandwidth information is provided to the storage operating system that handles client requests.

After the client I/O processing is throttled down, the source cluster continues to perform incremental replication in block B345. The process then reverts to block B339 so that the migration agent can iteratively determine and confirm that the throughput rate is sufficient to complete the migration operation. Once that determination is made, in block B347, the migration agent 364A sends a message to migration agent 364B that it is ready to start the cutover phase. The cutover phase has been described above and the migration operation is then completed or aborted, if there is an error, as described above in detail.

Figure 4:
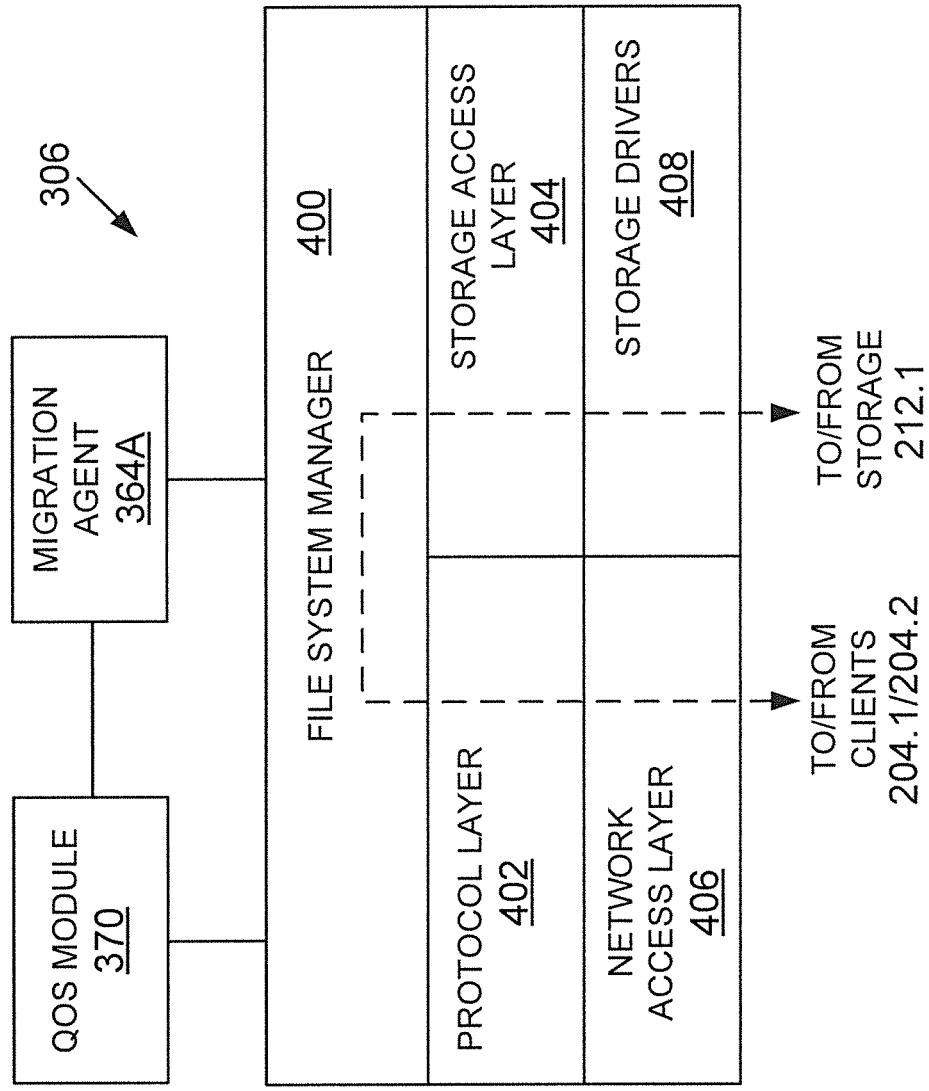
FIG. 4 shows a block diagram of an operating system, used according to one embodiment.

Operating System: FIG. 4 illustrates a generic example of storage operating system 306 executed by node 208.1, according to one embodiment of the present disclosure. The storage operating system 306 manages all the storage volumes and conducts read and write operations. To complete the migration operation within the cutover duration, the migration agents at all the nodes interface with the storage operating system 306 layers. The QOS module 370 also interfaces with the storage operating system 306 to throttle client write requests to increase the throughput rate for the BRE to complete the migration operation.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operations, i.e. executes read/write operations on storage in response to client 204.1/204.2 requests.

Operating system 306 may also include a protocol layer 402 and an associated network access layer 406, to allow node 208.1 to communicate over a network with other systems, such as clients 204.1/204.2. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients 204.1/204.2 and mass storage devices 212.1 are illustrated schematically as a path, which illustrates the flow of data through operating system 306.

The operating system 306 may also include a storage access layer 404 and an associated storage driver layer 408 to allow D-module 216 to communicate with a storage device. The storage access layer 404 may implement a higher-level storage protocol, such as RAID, while the storage driver layer 408 may implement a lower-level storage device access protocol, such as FC or SCSI.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 5:
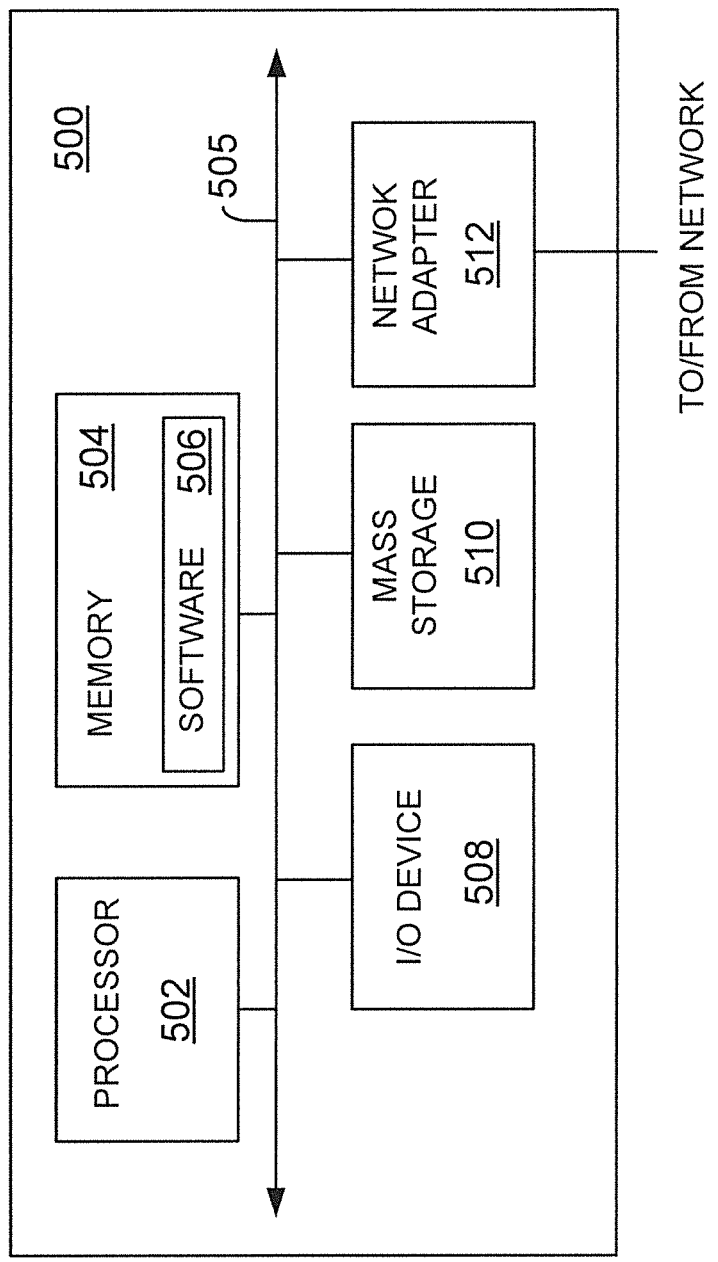
FIG. 5 shows an example of a processing system used according to one embodiment.

Processing System: FIG. 5 is a high-level block diagram showing an example of the architecture of a processing system that may be used according to one embodiment. The processing system 500 can represent management console 120, client 104 or storage system 108, for example. Note that certain standard and well-known components which are not germane to the present invention are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain embodiments, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Software 506 which implements the process steps described above may reside in and execute (by processors 502) from memory 504.

Also connected to the processors 502 through the bus system 505 are one or more internal mass storage devices 510, and a network adapter 512. Internal mass storage devices 510 may be or include any conventional medium for storing large volumes of data in a non-volatile manner, such as one or more magnetic or optical based disks. The network adapter 512 provides the processing system 500 with the ability to communicate with remote devices (e.g., storage servers 20) over a network and may be, for example, an Ethernet adapter, a Fibre Channel adapter, or the like.

The processing system 500 also includes one or more input/output (I/O) devices 508 coupled to the bus system 63. The I/O devices 508 may include, for example, a display device, a keyboard, a mouse, etc.

Thus, a method and apparatus for migrating a virtual storage system have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for a non-disruptive migration of a source virtual storage system from a source cluster to a destination cluster, the source cluster and the destination cluster having a plurality of nodes executing instructions for a storage operating system, comprising:

monitoring a current transfer rate for migrating information from the source cluster to the destination cluster during a migration operation;

iteratively reducing a rate at which I/O requests are processed until a transfer rate for transferring the information from the source cluster to the destination cluster within the duration is reached; and entering a cutover phase for the migration operation when the virtual storage system presented by the source cluster is taken offline for the duration and after the information is migrated to the destination cluster, the virtual storage system is presented by the destination cluster.

2. The method of claim 1, wherein the migration operation begins after a setup phase when a destination virtual storage system is created to mirror the virtual storage system presented by the source cluster.

3. The method of claim 1, wherein to initiate the migration operation, a point in time copy of storage volumes managed by the virtual storage system is first taken as a baseline image and transferred to the destination cluster.

4. The method of claim 3, wherein any changes after the baseline image are incrementally replicated at the destination cluster during an update phase, while a client system continues to use the virtual storage system via the source cluster.

5. The method of claim 1, wherein a timer is used to monitor if the cutover phase can be completed within the duration, before providing access to the virtual storage system via the destination cluster.

6. The method of claim 1, wherein a state machine monitors a plurality of phases for the migration operation and if the cutover phase cannot be completed within the duration, the migration operation is aborted.

7. The method of claim 1, wherein a state machine monitors a plurality of phases for the migration operation and if the cutover phase cannot be completed within the duration, then the migration operation reverts to an update phase where any changes since a baseline image of the source storage volumes is taken are incrementally replicated at the destination cluster.

8. The method of claim 1, wherein a master migration agent interfaces with a plurality of migration agents executed at a plurality of nodes for migrating information at source volumes managed by the plurality of nodes for the virtual storage system presented by the source cluster.

9. A machine implemented method for a non-disruptive migration operation for migrating a source virtual storage system from a source cluster to a destination cluster, the source cluster and the destination cluster having a plurality of nodes executing instructions for a storage operating system, comprising:

generating a destination virtual storage system during a setup phase of the migration operation such that storage space can be presented to a client after completing the migration operation;

generating a plurality of storage volumes at the destination cluster that are similar in size and attributes as a plurality of source storage volumes used by the virtual storage system presented by the source cluster to the client;

taking a baseline point in time copy of the plurality of source storage volumes and replicating the baseline point in time copy at the destination storage volumes during a baseline phase of the migration operation;

during an update phase, taking incremental point in time image of the plurality of source storage volumes for any changes after the baseline point in time copy was taken;

during an administrative cutover phase, monitoring a current transfer rate at which information from the source cluster is being migrated to the destination cluster;

iteratively reducing a rate at which I/O requests for a client are processed until a desired transfer rate for transferring information from the source cluster to the destination cluster within a duration is reached; and executing a cutover phase when the virtual storage system presented by the source cluster is taken offline for the duration and after the information is migrated to the destination cluster, the destination virtual storage system with destination storage volumes is presented by the destination cluster to the client to read and write data.

10. The method of claim 9, wherein during the update phase, a client system continues to use the virtual storage system via the source cluster.

11. The method of claim 9, wherein a timer is used to monitor if the cutover phase can be completed within the duration, before providing access to the virtual storage system via the destination cluster.

12. The method of claim 9, wherein a state machine monitors a plurality of phases for the migration operation and if the cutover phase cannot be completed within the duration, the migration operation is aborted.

13. The method of claim 9, wherein a state machine monitors various phases of the migration operation and if the cutover phase cannot be completed within the duration, then the migration operation reverts to the update phase.

14. The method of claim 9, wherein a master migration agent interfaces with a plurality of migration agents executed at a plurality of nodes for migrating information at source volumes managed by the plurality of nodes for the virtual storage system presented by the source cluster.

15. A system for a non-disruptive migration operation, comprising:

a memory having machine readable medium comprising machine executable code having instructions stored thereon; and a processor module coupled to the memory configured to execute the machine executable code to:

generate a destination virtual storage system during a setup phase of a migration operation such that storage space can be presented to a client after completing the migration operation;

generate a plurality of storage volumes at a destination cluster that are similar in size and attributes as a plurality of source storage volumes used by a virtual storage system presented by a source cluster to the client;

take a baseline point in time copy of the plurality of source storage volumes and replicating the baseline point in time copy at the destination storage volumes during a baseline phase of the migration operation;

during an update phase, take incremental point in time image of the plurality of source storage volumes for any changes after the baseline point in time copy was taken;

during an administrative cutover phase, monitor a current transfer rate at which information from the source cluster is being migrated to the destination cluster;

iteratively reduce a rate at which I/O requests for a client are processed until a desired transfer rate for transferring information from the source cluster to the destination cluster within a duration is reached; and execute a cutover phase when the virtual storage system presented by the source cluster is taken offline for the duration and after the information is migrated to the destination cluster, the destination virtual storage system with destination storage volumes is presented by the destination cluster to the client to read and write data.

16. The system of claim 15, wherein during the update phase, a client system continues to use the virtual storage system via the source cluster.

17. The system of claim 15, wherein a timer is used to monitor if the cutover phase can be completed within the duration, before providing access to the virtual storage system via the destination cluster.

18. The system of claim 15, wherein a state machine monitors a plurality of phases for the migration operation and if the cutover phase cannot be completed within the duration, the migration operation is aborted.

19. The system of claim 15, wherein a state machine monitors various phases of the migration operation and if the cutover phase cannot be completed within the duration, then the migration operation reverts to the update phase.

20. The system of claim 15, wherein a master migration agent interfaces with a plurality of migration agents executed at a plurality of nodes for migrating information at source volumes managed by the plurality of nodes for the virtual storage system presented by the source cluster.

21. A non-transitory, machine readable storage medium having stored thereon instructions for performing a method for a non-disruptive migration operation, comprising machine executable code which when executed by at least one machine, causes the machine to:

generate a destination virtual storage system during a setup phase of the migration operation such that storage space can be presented to a client after completing the migration operation;

generate a plurality of storage volumes at a destination cluster that are similar in size and attributes as a plurality of source storage volumes used by a virtual storage system presented by a source cluster to the client;

take a baseline point in time copy of the plurality of source storage volumes and replicating the baseline point in time copy at the destination storage volumes during a baseline phase of the migration operation;

during an update phase, take incremental point in time image of the plurality of source storage volumes for any changes after the baseline point in time copy was taken;

during an administrative cutover phase, monitor a current transfer rate at which information from the source cluster is being migrated to the destination cluster;

iteratively reduce a rate at which I/O requests for a client are processed until a desired transfer rate for transferring information from the source cluster to the destination cluster within a duration is reached; and execute a cutover phase when the virtual storage system presented by the source cluster is taken offline for the duration and after the information is migrated to the destination cluster, the destination virtual storage system with destination storage volumes is presented by the destination cluster to the client to read and write data.

22. The storage medium of claim 21, wherein a timer is used to monitor if the cutover phase can be completed within the duration, before providing access to the virtual storage system via the destination cluster.

23. The storage medium of claim 21, wherein a state machine monitors a plurality of phases for the migration operation and if the cutover phase cannot be completed within the duration, the migration operation is aborted or reverts to the update phase.

24. The storage medium of claim 21, wherein a master migration agent interfaces with a plurality of migration agents executed at a plurality of nodes for migrating information at source volumes managed by the plurality of nodes for the virtual storage system presented by the source cluster.

* * * * *